Jan. 24, 1939.  A. M. FROST  2,144,622
MAGAZINE FOR MOTION PICTURE CAMERAS
Filed July 27, 1936

ADOLPH M. FROST,
INVENTOR,
BY Julian J. Wittel,
his ATTORNEY.

Patented Jan. 24, 1939

2,144,622

UNITED STATES PATENT OFFICE 2,144,622

MAGAZINE FOR MOTION PICTURE CAMERAS

Adolph M. Frost, Arverne, N. Y., assignor of ninety percent to Ernest Stern, Astoria, N. Y.

Application July 27, 1936, Serial No. 92,701

3 Claims. (Cl. 242—71)

This invention relates to magazines for moving picture cameras, and has for its main object to provide a novel, simple, efficient means to insure that the film in the magazine is at a standstill, during the time of each exposure.

Another object of this invention is to provide a magazine for a moving picture camera as characterized hereinbefore wherein the mechanical spring, etc., means, now in use for the purpose mentioned, are all eliminated and said object is attained by a substantially instantaneous brake action on the film in advance of the portion thereof to be next exposed.

Still another object of my invention is to provide a braking action by the appropriate construction of the guide path for and the inherent resiliency of the film itself.

Still further objects of this invention will be apparent as the specification of the same proceeds.

The usual motion picture camera has an aperture plate, against this acts a spring pressure plate to stop and hold the film still during the time of exposure. In some cases this aperture plate and the corresponding pressure plate are placed in the film magazine. The adjustment of this spring tension is very critical and unreliable. If too loose, it produces an unsteady picture, if too tight, it may retard the action of the camera or damage the perforations of the film, and it is a constant seat of trouble by causing scratches and abrasions, thereby marring the picture itself.

Some of the present motion picture cameras employ a pilot pin which securely holds the film during the time of exposure, but this method requires complicated mechanism to function accurately.

My invention remedies all these shortcomings and mechanical difficulties by eliminating the pressure upon the aperture plate with an extremely simple braking device, furthermore only the perforated or outside edge of the film is in contact with the walls of the guide slot for the same, and neither the front, nor the back of the active portion of the film is ever in contact with any part of the mechanism while passing through said slot, thereby preventing any possible chances for scratchings or abrasions on the picture portion of the film. This braking device is placed in close proximity to the aperture plate. It has an automatic and instantaneous action upon the film as soon as the intermittent motion ceases to pull the film downward and holds the film in a positive grip, is still and steady during the time of exposure.

While this grip is positive, it is still gentle, and does not retard the action of the camera, and feeds the film in an even flow.

In the preferred form, my braking device consists of two or more raised projections on the edges of the narrow part of the film channel and the film will go through between them in a wave line formation. Due to the resiliency and the natural springy tendency of the film, a slight friction will arise which will be sufficient to stop the film securely in its path for the duration of the exposure. It will be further shown that the inner structure of my film magazine has an upper compartment which holds the unexposed film, and a lower compartment which receives the exposed film, and between these compartments is provided a slot facing the aperture plate, the width of said slot corresponding to the thickness of the film which is held flat against the aperture plate without exerting any pressure upon the film itself.

In the drawing, forming a part of this specification and accompanying the same, and in which similar characters of reference indicate identical parts in the various figures.

Figure 2:
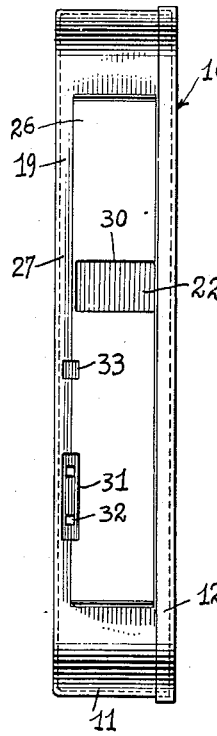
Fig. 2 is an end elevation or front view thereof.

Referring now to the drawing more closely, by characters of reference, the numeral 10 indicates my magazine for motion picture cameras, in general, being in this embodiment thereof formed of a lower box 11, and a top or cover 12 having light proof qualities preventing all light from entering, excepting that so desired, during the time of exposure, while the picture is being made.

Figure 1:
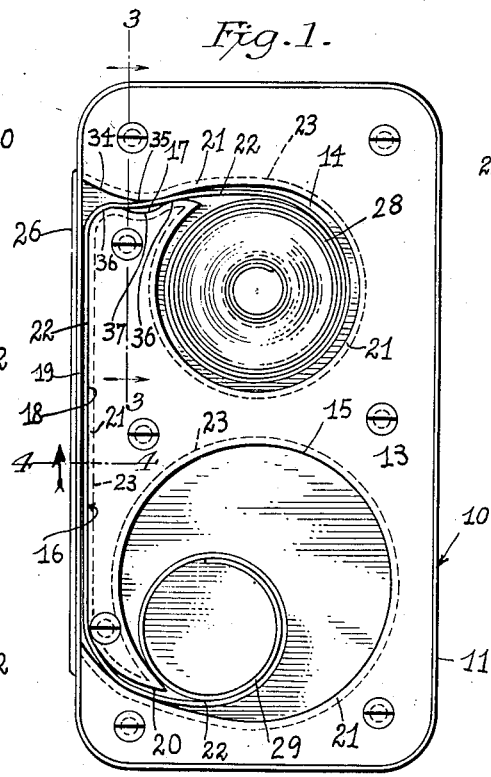
Fig. 1 is a plan view of my improved mechanism for magazines for motion picture cameras, the cover thereof having been removed.
Figure 3:
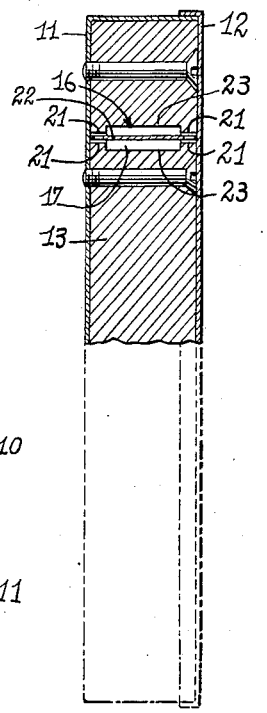
Fig. 3 is a fragmentary sectional elevation taken on the line 3—3 of Fig. 3, the rest of the magazine being diagrammatically indicated with dash and dot lines only.
Figure 4:
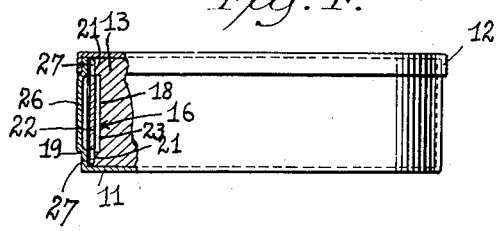
Fig. 4 is a top view of my improved magazine a portion thereof being shown in section as indicated by the line 4—4 in Fig. 1.

In the embodiment shown, I place a suitably shaped body or insert 13 into the box 11, entirely and snugly fitting the inside of box 11, and having formed therein an upper compartment 14 for the roll of the unexposed fresh film, a lower compartment 15 for the roll of the exposed film, and a narrow slot or path of the configuration shown in Fig. 1 and generally indicated by the numeral 16, having an upper lateral portion 17, communicating with the circular film compartment 14, a longitudinal main portion 18, being partly formed by the respective side wall 19 of the box 11, and the contour of insert 13, and a lower generally lateral end portion 20, communicating with the recess 15.

Figure 5:
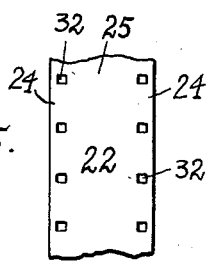
Fig. 5 shows a fragment of a film to be used in my magazine, it being understood that any size or width of film may be used.

All along the upper and lower ends or openings of the film compartments 14 and 15, and particularly of the film slot or path 16, I provided projecting ledges or flanges 21, the rest of the walls of the recesses and of the path 16 being recessed or further away from the film 22 as indicated at 23. This closer support of the film at the two marginal edges 24 thereof, (Fig. 5) and the recess of the guiding walls along the center part 25 of said film has the object to insure that the film is in the right position, smooth, flat and running without obstruction and the picture taking portions thereof are not exposed to friction or other harmful effects. For the same purpose the portion 26 of the exposure side or wall 19 of the magazine is bent or recessed outwardly while the upper and lower margins of said wall are left in closer contact with the mentioned edges 24 of the film, as indicated at 27. The film 22 illustrated in the figures is of that style which will coil or roll up by its own inherent elasticity, and at 28 I show the unfinished feed out roll thereof, while at 29 the finished exposed film roll is shown as curling up by its own action in the recess 15. It will be, however, understood that I may employ any of the usual mechanical feed out and take up devices in the film compartment 14 and 15, if desired.

As it is well-known to those versed in the art, the exposure or front side 19 of the magazine will have an exposure aperture 30 for taking the successive pictures, a further aperture 31 through which any of the usual well-known propelling devices may reach the film and operate on the perforations 32 in the film, and in some constructions it may have a further smaller aperture 33 through which the so-called pilot pin may reach the film and hold the same during the exposures. These elements are no part of this invention, are well-known in the art, and for this reason they have not been further described in this specification.

In the projecting upper and lower ledges 21 of the upper wall 34 of the upper lateral reach or branch 17 of the film slot or path 16 I provide a downwardly projecting curved cam like portion 35, and placed opposite and at the two sides of the same I provide two curved cam like projections 36 in the lower wall 37. The arrangement of the cam-like rounded projections 35 and 36 is such that the film 22 in passing between them will be slightly pressed against each of them through its curvature between them and through its inherent resiliency, but it may snugly and still easily pass between them when it is being propelled by the devices through the aperture 31 as has been mentioned hereinbefore, and is well-known to those versed in the art. When, however, these propelling means for the film are stopped for the period of an exposure the inherent elasticity of the film will cause the same to be pressed against said cam projections 35 and 36 and its own friction thereon will instantly stop the feed out from the roll 28, the whole film will come to a standstill and will not move until the propelling mechanism will again act thereon. This is exactly the condition which is most desirable in a moving picture, and an absolute necessity in the making of them, since the film will be allowed a snug, smooth but easy movement, and said movement will be instantaneously brought to a standstill for the duration of the exposure, when the film propelling mechanism ceases to act and the exposure begins.

Aside of many other shortcomings and drawbacks, as some of them have been recited hereinbefore, the present propelling and stopping means for films have the great fault that after the film is attempted to be stopped a portion of the same, starting from the feed out roll 28, will still keep on moving by its own inertia, and my brake device formed by the cam projections 35 and 36 will arrest such an inertia movement of the film and will stop the same securely for the duration of the exposure, right at the feed out roll.

It will be obvious that instead of using three projections or cams 35 and 36, I may use several of them on both sides of the film, or I may use only one of them on each side spaced apart from one another and still have the described braking effect on said film, while of course I may use any other appropriate brake device for the purpose described and in the manner here indicated, instead of the simple one shown and described hereinbefore.

It is also obvious that other forms, shapes and constructions may be used to provide this inner structure, the film compartments, and the slot or path for the film, so, for instance, said recesses and path may be constructed by hollow bodies or frame like structures instead of the solid body 13, here indicated for the sake of simplicity.

In general, I want to remark that while I illustrate a preferred embodiment of my inventon, it is to be understood that changes and variations may be made in the details hereof, and I reserve my rights to such changes and variations which are in the within spirit of this specification and the scope of the claims hereunto appended.

What I claim as new, is:

1. In a magazine for motion picture cameras having a feed out and a take up compartment for the film and a narrow slot or path for the same between the two, permitting a snug but easy sliding of the film therealong, a brake device in the walls of said narrow path adapted to stop the film when its propelling mechanism ceases to operate, said brake device being formed by projections in the walls of said path at the opposite side of the film, against which the film is pressed by its own resiliency, oppositely placed narrow projecting ledges provided at both openings of said narrow path, the rest of the walls of said path being recessed from said film, said projections being provided in said ledges.

2. In a magazine for motion picture cameras having a feed out and a take up compartment for the film and a narrow slot or path for the same between the two, permitting a snug but easy sliding of the film therealong, a brake device in the walls of said narrow path adapted to stop the film when its propelling mechanism ceases to operate, said brake device being formed by projections in the walls of said path at the opposite side of the film against which the film is pressed by its own resiliency, said brake device being applied adjacent to said feed out roll, and no other brake or pressure device being used on the film.

3. In a magazine for motion picture cameras, as set forth in claim 2, the feed out and take up rolls being controlled by the resiliency of the film itself, and not being operated by any mechanical device.

ADOLPH M. FROST.